US011414241B2

(12) United States Patent
Carrell et al.

(10) Patent No.: US 11,414,241 B2
(45) Date of Patent: Aug. 16, 2022

(54) BIODEGRADABLE POLYSTYRENE COMPOSITES AND USE THEREOF

(71) Applicant: KWIK LOK CORPORATION, Union Gap, WA (US)

(72) Inventors: Donald Carrell, Union Gap, WA (US); Donald R. Allen, Idaho Falls, ID (US)

(73) Assignee: Kwik Lok Corporation, Union Gap, WA (US)

( * ) Notice: Subject to any disclaimer, the term of this patent is extended or adjusted under 35 U.S.C. 154(b) by 79 days.

(21) Appl. No.: 16/603,196

(22) PCT Filed: Apr. 6, 2018

(86) PCT No.: PCT/US2018/026610
§ 371 (c)(1),
(2) Date: Oct. 4, 2019

(87) PCT Pub. No.: WO2018/187784
PCT Pub. Date: Oct. 11, 2018

(65) Prior Publication Data
US 2020/0115111 A1     Apr. 16, 2020

Related U.S. Application Data

(60) Provisional application No. 62/483,109, filed on Apr. 7, 2017.

(51) Int. Cl.
| | |
|---|---|
| *B65D 33/16* | (2006.01) |
| *B65D 65/46* | (2006.01) |
| *C08J 5/18* | (2006.01) |
| *C08K 5/00* | (2006.01) |
| *C08K 5/053* | (2006.01) |
| *C08L 3/02* | (2006.01) |
| *C08L 23/08* | (2006.01) |
| *C08L 23/14* | (2006.01) |
| *C08L 25/10* | (2006.01) |
| *C08L 67/02* | (2006.01) |

(52) U.S. Cl.
CPC ....... *B65D 33/1625* (2013.01); *B65D 65/466* (2013.01); *C08J 5/18* (2013.01); *C08K 5/0016* (2013.01); *C08K 5/053* (2013.01); *C08L 3/02* (2013.01); *C08L 23/08* (2013.01); *C08L 23/14* (2013.01); *C08L 25/10* (2013.01); *C08L 67/02* (2013.01); *C08L 2201/06* (2013.01); *C08L 2203/16* (2013.01); *C08L 2205/03* (2013.01); *C08L 2205/08* (2013.01)

(58) Field of Classification Search
None
See application file for complete search history.

(56) References Cited

U.S. PATENT DOCUMENTS

| | | | |
|---|---|---|---|
| 3,270,874 A | 9/1966 | Hilton | |
| 4,016,117 A | 4/1977 | Griffin | |
| 5,095,054 A | 3/1992 | Lay et al. | |
| 5,852,851 A * | 12/1998 | Cooper | B65D 33/1625 24/30.5 R |
| 2001/0039303 A1 * | 11/2001 | Loercks | B32B 27/10 524/47 |
| 2011/0195148 A1 | 8/2011 | Mentink et al. | |
| 2011/0196071 A1 * | 8/2011 | Mentink | C08L 3/06 524/51 |
| 2013/0231421 A1 * | 9/2013 | Liao | C08L 3/04 524/47 |
| 2014/0250635 A1 | 9/2014 | Vantrease | |

FOREIGN PATENT DOCUMENTS

| | | |
|---|---|---|
| EP | 0 409 781 A2 | 1/1991 |
| JP | 3-74446 A | 3/1991 |
| JP | 2003-518541 A | 6/2003 |
| JP | 2012-505280 A | 3/2012 |
| WO | 01/48078 A1 | 7/2001 |
| WO | 2011/020170 | 2/2011 |

OTHER PUBLICATIONS

Bastioli et al., "Starch in Polymers Technology," *ACS Symposium Series*, Jan. 1, 2012. (26 pages).
International Search Report and Written Opinion, dated Jul. 13, 2018, for International Application No. PCT/US2018/026610. (10 pages).
Office Action, dated Oct. 29, 2021, for Taiwan Application No. 107112179. (w/ English Translation) (14 pages).
van Soest et al., "Crystallinity in starch plastics: consequences for material properties," *Trends in Biotechnology* 75:208-213, Jun. 1997.
Office Action (w/ English Translation), dated Mar. 22, 2022, for Japanese Application No. 2020-504283, (6 pages).

* cited by examiner

*Primary Examiner* — Robert T Butcher
(74) *Attorney, Agent, or Firm* — Seed IP Law Group LLP

(57) ABSTRACT

Disclosed herein are biodegradable resinous composite and extruded sheets comprising polystyrene and a thermoplastic amorphous starch and use thereof.

20 Claims, 5 Drawing Sheets

BIODEGRADABLE POLYSTYRENE COMPOSITES AND USE THEREOF

BACKGROUND

Polystyrene is a versatile thermoplastic resin and can be used in three main forms: general purpose polystyrene also known as crystal polystyrene (GPPS), high impact polystyrene (HIPS) and expandable polystyrene (EPS). The main properties of polystyrenes are high stiffness, excellent optical clarity for GPPS, and good mechanical properties, such as toughness for HIPS. All polystyrenes have excellent processability and a low heat capacity value leading to process energy reduction. Owing to high stiffness and low density, articles made from polystyrene have excellent strength-to-weight ratio, which offers certain environmental benefits, such a reduction of weight. Nevertheless, the ubiquity of polystyrene in consumer goods also means that it has significant environmental impact due to large and sustained demands for petroleum-based commodity chemicals (styrene). More importantly, polystyrene is difficult to recycle and nearly impossible to biodegrade.

Polystyrene blended with materials from renewable sources (cellulose, starch, linseed oil epoxy etc.) is promising for reducing its carbon footprint. However, known polystyrene blends can face significant technical challenges in matching the physical and performance criteria of unblended polystyrene. In any event, biodegradation remains elusive as the polystyrene portion is resistant to degradation, and only the renewable component is likely to biodegrade.

Thus, there exists a need to provide biodegradable polystyrene blends that employ components from renewable sources and achieve biodegradation within a meaningful timeframe.

BRIEF SUMMARY

Various embodiments provide polystyrene composites that are biodegradable owing to the unique homogeneous and amorphous structure of the composite. In particular, the biodegradable polystyrene composite comprises: 55-85% (w/w) polystyrene; and 15-45% (w/w) thermoplastic amorphous starch; wherein the thermoplastic amorphous starch is derived from one or more native starches and does not exhibit an X-ray diffraction peak within 20-25 degrees (2θ), which peak would have been present in the one or more native starches.

In a further embodiment, the thermoplastic amorphous starch of the biodegradable polystyrene composite has less than 1% (w/w) of water.

In other embodiments, the thermoplastic amorphous starch is derived from one or more native starches and further includes a plasticizer that forms hydrogen bonds with the one or more native starches. In more specific embodiments, the plasticizer is glycerin, sorbitol, glycols, maltodextrin, ethylene glycol, propylene glycol, urea or a combination thereof.

In a further embodiment, the thermoplastic amorphous starch of the biodegradable polystyrene composite is less than 10% crystalline.

In yet another embodiment, the biodegradable polystyrene composite further includes a compatibilizer, such as styrene-ethylene/butylene-styrene.

In another embodiment, the biodegradable polystyrene composite further includes a biodegradable resin additive, such as polybutylene succinate (including bioPBS), polyhydroxyalkanoate, polybutyrate adipate terephthalate, or a mixture thereof.

In a more specific embodiment, the polystyrene is polystyrene-polybutadiene copolymer (e.g., HIPS)

In yet another specific embodiment, the thermoplastic amorphous starch is derived from a blend of two or more native starches (e.g., cornstarch and potato starch).

Further embodiments provide extruded sheets of the biodegradable polystyrene composite according to any one of the above embodiments. One embodiment provides an extruded sheet of a biodegradable polystyrene composite, the biodegradable polystyrene composite comprises: 55-85% (w/w) polystyrene; and 15-45% (w/w) thermoplastic amorphous starch; wherein the thermoplastic amorphous starch is derived from one or more native starches and does not exhibit an X-ray diffraction peak within 20-25 degrees (2θ).

In more specific embodiments, the extruded sheets are 0.01-0.09 inch in thickness. In various more specific embodiments, the extruded sheets are 0.01-0.03 inch in thickness, suitable for, e.g., labels, nursery tags, produce bunch closures, etc. In other more specific embodiments, the extruded sheets are 0.02-0.09 inch in thickness, suitable for, e.g., bag closures. In other embodiments, the extruded sheets are 0.02-0.09 inch thick, or 0.02-0.08 inch thick, or 0.02-0.06 inch thick, or 0.03-0.05 inch thick, or 0.01-0.02 inch thick, or 0.02-0.03 inch thick, or 0.01 inch thick, 0.02 inch thick, or 0.03 inch thick, or 0.04 inch thick, or 0.05 inch thick, or 0.06 inch thick, or 0.07 inch thick, or 0.08 inch thick or 0.09 inch thick.

Yet another embodiment provides a biodegradable bag closure including a flat resinous body having an access opening and a bag-holding central aperture, wherein the access opening joins the bag-holding central aperture to define a continuous space, and wherein the flat resinous body includes a biodegradable polystyrene composite of any one of the above embodiments, wherein the flat resinous body is 0.02-0.09 inch thick.

DETAILED DESCRIPTION

Figure 1:
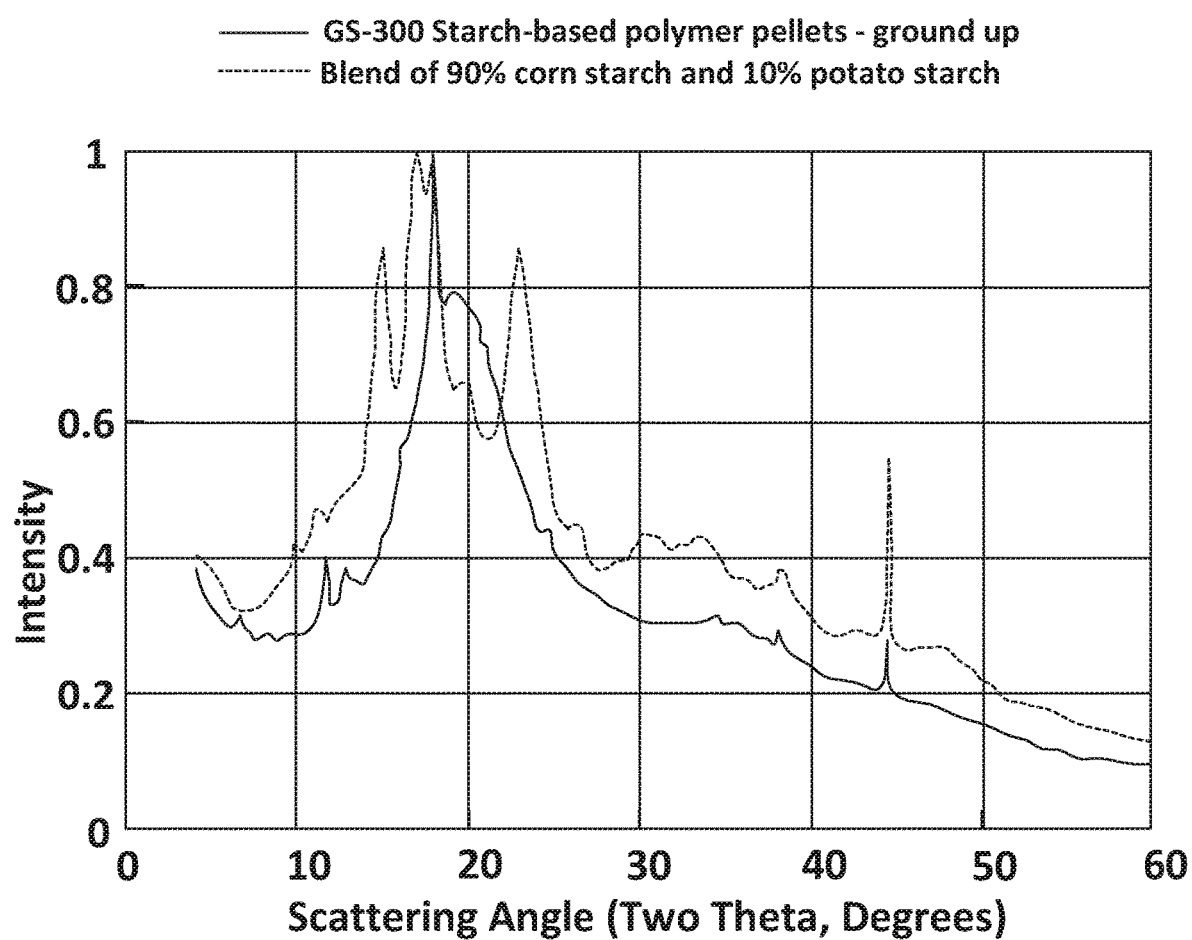
FIG. 1 shows the X-ray diffraction patterns of thermoplastic amorphous starch as compared to native starch blend.

Various embodiments of the present disclosure provide composites of petrochemical-based polymers (e.g., polystyrene) and plant-based polymers (e.g., starch). In particular, the polymer composite has a high degree of homogeneity on a microscopic or molecular level. In the homogeneous composites according to the present disclosure, the polymeric chains of the polystyrene component and the starch component are intertwined such that the starch-consuming microbes cannot readily differentiate the styrene units of the polystyrene from the glucose units of the starch, thereby indiscriminately breaking down the petrochemical-based and plant-based polymer chains into carbon dioxide, methane, and water.

Moreover, the composite of the present disclosure retains the thermoplastic and mechanical properties of unblended polystyrene due, at least in part, to the starch component, which has been modified from the native starch to impart thermoplastic characteristic. In particular, such a thermoplastic starch has a much lower degree of crystallinity (e.g., less than ⅕) of native starch from which it is derived. The amorphous state of the thermoplastic starch component improves its miscibility with the polystyrene component, which is also typically amorphous. In addition, the thermoplastic starch component has an extremely low moisture content (e.g., less than 1% w/w water) and is water-resistant, rendering it less susceptible to retrogradation.

These components are discussed in more detail below.

Polystyrene

As used throughout this application, the terms "polystyrene" refer to a styrenic homopolymer or copolymer having at least one styrene monomer linkage (such as benzene ring having an ethylene substituent) within the repeating backbone of the polymer. The styrene linkage can be represented by the general formula: $[—CH_2—CH(Phenyl)-]_n$. Polystyrene may be formed by any method known to those skilled in the art. Examples of styrenic polymers include but are not limited to high impact polystyrene (HIPS), super high impact polystyrene (SHIPS), general purpose polystyrene (GPPS), styrene acrylonitrile (SAN), styrene block copolymer (SBC), and acrylonitrile butadiene styrene (ABS).

HIPS is sometimes called rubber-modified polystyrene and is normally produced by copolymerization of styrene and a synthetic rubber (e.g., polybutadiene). Examples of HIPS include but are not limited to EB6025 Rubber Modified High Impact Polystyrene, which is available from Chevron Phillips Company (The Woodlands, Tex.); and 6210 High Impact Polystyrene, which is available from Ineos Nova LLC (Channahon, Ill.). Other examples include Impact Polystyrene 825E and 830E, both of which are available from Total Petrochemicals USA, Inc. Examples of SHIPS include but are not limited to TOTAL Petrochemicals 945E which is available from TOTAL PETROCHEMICALS USA, INC. (Houston, Tex.) and STYRON™. 487 High Impact Polystyrene available from Styron LLC (Berwyn, Pa.).

GPPS is often called crystal polystyrene, as a reference to the clarity of the resin. Examples of GPPS include but are not limited to Crystal Polystyrene 524B and Crystal Polystyrene 525B, both of which are available from Total Petrochemicals USA, Inc. Non-limiting examples of styrene acrylonitrile (SAN) are the TYRIL™ family of SANs provided by Styron LLC (Berwyn, Pa.) and the Lustran™ SAN family of resins available from INEOS ABS (Koln, Germany). Styrene block copolymers (SBC) include styrene butadiene copolymers (SB). The styrene-butadiene copolymers that are suitable for packaging applications are those resinous block copolymers that typically contain a greater proportion of styrene than butadiene and that are predominantly polymodal with respect to molecular weight distribution. A non-limiting example of SB is DK 13 K-Resin™. Styrene-Butadiene Copolymer, which is available from Chevron Phillips Chemical Company (The Woodlands, Tex.). Acrylonitrile Butadiene Styrene (ABS) is a terpolymer of acrylonitrile, butadiene and styrene. Usual compositions are about half styrene with the balance divided between butadiene and acrylonitrile. Considerable variation is, of course, possible resulting in many different grades of acrylonitrile butadiene styrene with a wide range of features and applications.

In a preferred embodiment, the polystyrene is graft copolymer of polystyrene, which is manufactured by continuous mass polymerization of styrene monomer. An elastomer (e.g., a polybutadiene) is incorporated during polymerization to achieve impact resistance property. The resulting copolymer is a high impact strength polystyrene with high heat distortion temperature.

In a typical embodiment, the polystyrene is a polystyrene-polybutadiene copolymer that has the following characteristics: Melt flow rate (MFR) is 3 g/10 min (as measured by ASTM D 1238) at 200° C. and 5 kg. In a tensile test (ASTM D 638), the polystyrene may have tensile strength 24 MPa, tensile elongation 45%, and tensile modulus 2206 mPa. In a flexural test (ASTM D 790), the polystyrene may have flexural modulus of 2108 MPa and flexural strength of 49 MPa.

Thermoplastic Amorphous Starch

Starch is one of the most abundant renewable resources because it is biosynthesized by numerous plants and is completely biodegradable. The plant sources for starch include grains (e.g., wheat, corn, rice), tubers (e.g., potato, cassava) and legume (e.g., pea). Starch is therefore described by its plant source as cornstarch, potato starch, tapioca starch (cassava roots), and so on. Regardless of the plant sources, native starch is mostly composed of linear amylose and highly branched amylopectin, both of which are glucose polymers connected by glycoside bonds.

In its native form, starch occurs in the form of granules. The granules vary in shape, size, and relative proportions of amylose and amylopectin depending on the source of the starch. Starch granules have different sizes and shapes depending on the biological source from which they originate. For example, the starch granules of potato and cassava have diameters between 15 and 100 µm, or more typically between 50-80 µm Starch is considered a crystalline material. Starch granules show birefringence when observed in polarized light. Birefringence indicates a degree of molecular organization. The starch granule is thus partially crystalline and insoluble in water at room temperature. X-ray scattering results have shown that granular starch has an overall crystallinity of about 20-50%. The amorphous regions are formed by amylose and residues around the branch points of amylopectin. The linear segments of amylopectin are present in the form of double helices that are crystallized into thin lamellar domains. Depending on the plant sources, starch has different crystalline structures, commonly known as A, B, C types, respectively, for grain, tuber and legume sources. Table 1 shows typical crystallographic parameters for representative starch from each source.

TABLE 1

The crystallographic parameters of A-, B- and C-type crystals

| Type | Angle (°, 2θ) | d-Value (Å) | Intensity[a] |
|---|---|---|---|
| A-waxy corn | 14.8 | 6.00 | s |
| | 16.6 | 5.35 | vs |

TABLE 1-continued

The crystallographic parameters of A-, B- and C-type crystals

| Type | Angle (°, 2θ) | d-Value (Å) | Intensity[a] |
|---|---|---|---|
| | 17.7 | 5.01 | s |
| | 22.6 | 3.92 | vs |
| | 26.3 | 3.39 | w |
| | 30.1 | 2.96 | m |
| | 33.2 | 2.70 | w |
| B-potato | 5.5 | 16.2 | m |
| | 10.8 | 8.17 | m |
| | 14.8 | 5.99 | s |
| | 17.0 | 5.21 | vs |
| | 19.3 | 4.60 | s |
| | 22.1 | 4.03 | vs |
| | 23.8 | 3.74 | s |
| | 26.1 | 3.42 | w |
| | 30.9 | 2.90 | w |
| | 34.0 | 2.64 | m |
| C-pea | 14.8 | 5.98 | s |
| | 16.8 | 5.29 | vs |
| | 17.6 | 5.03 | m |
| | 22.6 | 3.93 | s |
| | 30.2 | 2.96 | w |
| | 33.5 | 2.67 | w |

As shown, despite subtle differences in the angles (2θ) and peak intensities, the native starch all share common peak characteristics. For instance, a strong peak (s) is present at about 20-25 degree angle for all three types of starch.

Native starch is not thermoplastic for several reasons. It is highly hydrophilic due to the large amount of hydroxyl groups present on the glucose units. In particular, amylose dissolves in water and amylopectin swells in the presence of water. Thus, native starch disintegrates in water and loses its properties when exposed to moisture. The hydroxyl groups form numerous strong hydrogen bonds between starch chains, which hold the starch molecules together and in granular form. When it is heated, starch undergoes thermal degradation before its crystalline melting point is reached. Therefore, starch cannot be melt-processed via conventional plastic equipment.

The thermoplastic amorphous starch according to the present disclosure is highly modified from the native starch. The thermoplastic amorphous starch differs from the native starch in several significant respects, including much reduced degrees of crystallinity, granule sizes, moisture content and sensitivity to water.

Through the use of organic plasticizers and processed under heat and shear force, native starch can be modified and de-structured into thermoplastic amorphous starch. Suitable plasticizers include any hydrogen bond forming or hydrophilic organic molecules, including without limitation glycerin (glycerol), sorbitol, glycols, maltodextrin, ethylene glycol, propylene glycol, urea, and the like. These organic hydrophilic plasticizers penetrate starch granules, and destroy the inner hydrogen bonds of starch under high temperature, pressure, and shearing. The presence of the plasticizers greatly reduces or eliminates starch-starch interactions because they are replaced by starch-plasticizer interactions.

Because the plasticizers are themselves hydrophilic or hygroscopic, if the amount present is more than what is needed to displace the starch-starch hydrogen bonding, the excess plasticizer may attract atmospheric moisture. Thus, the amount of the plasticizer should be calibrated to minimize hygroscopicity. In various embodiments, the plasticizer may be in the range of 10-35%, more typically, 20-35%, or more typically, 27-32%, by weight of the thermoplastic amorphous starch.

The amorphous nature of the modified starch is evident by the absence of the strong peak at 20-25 degrees (more typically 22-24 degrees) (2θ), which strong peaks are present in all the crystal forms the native starch. FIG. 1 shows the X-ray diffraction patterns of a thermoplastic amorphous starch (GS-300, available from BiologiQ Inc., Idaho, U.S.), which is modified from a blend of potato starch (10%) and corn starch (90%) and blending (by weight of the resulting blend) about 27-32% glycerin as the plasticizer. As a comparison, a simple blend of the native starch (10% potato starch and 90% corn starch) exhibit a strong peak at about 20-25 (or 22-24) degrees. FIG. 1 further shows that the amorphous starch has fewer and less intense peaks when compared to those of the native starch. With the exception of a peak at about 18 degree, the amorphous starch shows broad curves instead of sharp peaks, indicating a much reduced degrees of crystallinity compared to native starch. Typically, the thermoplastic amorphous starch is less than 10% crystalline, or more typically, less than 5% crystalline, or more typically, less than 3% crystalline. In contrast, native starch has about 50% crystallinity.

The de-structuring process, involving heat, pressure, shear or a combination thereof, also greatly reduces the starch granule sizes. Typically, the thermoplastic amorphous starch has a granule size of less than 2 μm, or more typically, less than 1 μm. The strong interactions between the plasticizer and the starch reduce or eliminate the tendency of the starch molecule to recrystallize. The smaller granular sizes enable the starch component to interact and blend with the polystyrene component on a microscopic level to promote homogeneity.

The thermoplastic amorphous starch has extremely low moisture content. Without wishing to be bound by theory, it is believed that the organic plasticizers have largely displaced the water molecules in hydrogen bonding with the starch molecules. The strong interaction between starch and organic plasticizer also precludes the infiltration by water, including atmospheric moisture. The thermoplastic amorphous starch may dissolve in boiling water (though it takes much longer than native starch), it can be dried out and revert to the low-water content and amorphous state (i.e., water cannot displace the plasticizer). Typically, the thermoplastic amorphous starch has less than 5% of water, or less than 3% of water, or less than 1% of water (w/w), or more typically, less than 0.5% of water (w/w).

Examples of suitable thermoplastic amorphous starch are available from BiologiQ, under the tradename ESR ("Eco Starch Resin") or NuplastiQ®. Specific examples include, but are not limited to GS-270, GS-300, and GS-250. Specific characteristics of such ESR materials will be described in further detail herein.

ESR (an example of a starch-based or starch-based polymeric material) can be formed from a plurality of materials (e.g., a mixture) including one or more starches. For example, the one or more starches can be produced from one or more plants, such as corn starch, tapioca starch, cassava starch, wheat starch, potato starch, rice starch, sorghum starch, and the like. In various embodiments, the starch-based polymers can be formed from a mixture of starches derived from two or more plants, three or more plants, or four or more plants. In some cases, the materials from which the one or more starch-based polymeric materials are formed can also include a plasticizer. An amount of water can be present in the finished one or more starch-based polymeric materials.

In one embodiment, the one or more starch-based polymeric materials can be formed from a plurality of materials including at least about 65%, at least about 70%, at least about 75%, or at least about 80% by weight of one or more starches.

A plasticizer used in forming the one or more starch-based polymeric materials can include polyethylene glycol, sorbitol, glycerin, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, tearates, lactic acid esters, citric acid esters, adipic acid esters, stearic acid esters, oleic acid esters, other acid esters, or combinations thereof. In specific implementations, the plasticizer can include glycerin.

In another embodiment, the materials from which the one or more carbohydrate-based polymeric materials are formed can include at least about 12%, at least about 15%, at least about 18%, at least about 20%, or at least about 22% by weight of a plasticizer. Additionally, the materials can include no greater than about 35%, no greater than about 32%, no greater than about 28%, or no greater than about 25% by weight of a plasticizer.

In some cases, the finished one or more starch-based polymeric materials include no greater than about 5% by weight water, no greater than about 4% by weight water, no greater than about 3% by weight water, no greater than about 2% by weight water, or no greater than about 1% by weight water. Additionally, the finished one or more starch-based polymeric materials can include at least about 0.1% by weight water, at least about 0.3% by weight water, at least about 0.6% by weight water, or at least about 0.8% by weight water. In an illustrative example, the finished one or more starch-based polymeric materials include from about 0.1% by weight to about 5% by weight water. In another illustrative example, the finished one or more starch-based polymeric materials include from about 0.4% by weight to about 2°% by weight water. In an additional illustrative example, the finished one or more starch-based polymeric materials can include from about 0.5% by weight to about 1.5% by weight water. The ESR materials available from BiologiQ are examples of such finished starch-based polymeric materials, although it will be appreciated that other materials available elsewhere (e.g., at some future time) may also be suitable for use.

ESR may be provided in pellet form. Physical characteristics for GS-270 are shown in Table 2 below. GS-270 is formed from about 27% glycerin, with substantially the balance of the finished product being formed from or attributable to one or more starches as starting materials.

TABLE 2

| Property | Test Method | Nominal Value |
| --- | --- | --- |
| Density | ASTM D792 | 1.40 g/cm³ |
| THERMAL PROPERTIES | | |
| Melt Flow Index | ASTM D1238 | 1.98 g/10 min |
| Melting Temp. Range | ASTM D3418 | 166-180° C. |
| Glass Transition Temp. | ASTM D3418 | 81-100° C. |
| MECHANICAL PROPERTIES | | |
| Tensile Strength @ Yield | ASTM D638 | >30 MPa |
| Tensile Strength @ Break | ASTM D638 | >30 MPa |
| Young's Modulus | ASTM D638 | 1.5 GPa |

TABLE 2-continued

| Property | Test Method | Nominal Value |
| --- | --- | --- |
| Elongation at Break | ASTM D638 | <10% |
| Impact Resistance (Dart) | ASTM D5628 | 3.5 kg |
| ADDITIONAL PROPERTIES | | |
| Water Content | ASTM D6980 | ≤1% |

The above characteristics shown for GS-270 are exemplary of the other ESR products available from BiologiQ, although values may vary somewhat. For example, ESR products from BiologiQ may generally have a glass transition temperature ranging from about 70° C. to about 100° C. Those of skill in the art will appreciate that glass transition temperature can be indicative of degree of crystallinity. Other characteristics may similarly vary somewhat (e.g., ±25%, or ±10%) from values shown for GS-270. ESR has an amorphous structure (e.g., more amorphous than typical raw starch). ESR has low water content, as described. As ESR absorbs moisture, it exhibits plastic behavior and becomes flexible. When removed from a humid environment, the material dries out and becomes stiff again (e.g., again exhibiting less than about 1% water content). The moisture present in ESR (e.g., in pellet form) may be released in the form of steam during processing. As a result, sheets produced from a starch-based polymeric material such as ESR and a petrochemical-based polymeric material (e.g., polystyrene) may exhibit even lower water content, as the water in the ESR may typically be released during formation of the film or other article.

Such low water content in the starch-based polymeric material can be important, as significant water content results in incompatibility with the petro-chemical-based polymeric material when attempting to form a thin film, as the water vaporizes, resulting in voids within the film, as well as other problems.

Low water content is not achieved in the ESR material through esterification, as is common in some conventional TPS materials that may include relatively low water content. Such esterification can be expensive and complex to perform.

Processing at relatively high temperatures may result in some release of volatized glycerin (e.g., visible as smoke). Drying of pellets can be performed by introducing warm dry air, e.g., at 60° C. for 1-4 hours. Pellets should be dried to less than about 1% moisture content prior to processing. ESR pellets may simply be stored in a sealed container with a desiccant in a dry location, away from heat.

In addition to ESR being thermoplastic, the ESR may also be thixotropic, meaning that the material is solid at ambient temperature, but flows as a liquid when heat, pressure and/or frictional movement are applied. Advantageously, pellets of ESR can be used the same as petrochemical based pellets in standard plastic production processes. ESR materials may exhibit gas barrier characteristics. Products (e.g., films) made using such ESR pellets exhibit oxygen gas barrier characteristics (e.g., see Example 5 for specific exemplary results). ESR materials may be non-toxic and edible, made using raw materials that are all edible. ESR may be water resistant. For example, it may resist swelling under moist heated conditions to the point that it may not completely dissolve in boiling water within 5 minutes. ESR may be stable, in that it may not exhibit any significant retrogradation, even if left in relatively high humidity conditions, which characteristic differs from many other thermoplastic starch materials. If ESR is stored in such humid conditions, the excess absorbed water can simply be evaporated away, and once the water content is no more than about 1%, it can be used in forming a film or other article.

ESR includes very low water content. For example, although raw starch (e.g., used in forming ESR) may typically include about 13% water by weight, the finished ESR pellets available from BiologiQ include less than about 1% water. ESR materials are biodegradable, and as described herein, not only is the starch-based ESR material biodegradable, but when blended with other polymers, such as polystyrene, which are not biodegradable, the blended material is also substantially entirely biodegradable. Such results are quite surprising, and particularly advantageous. The Examples herein evidence such surprising results. Other typical thermoplastic starch materials do not claim or exhibit such characteristics when blended with other polymers.

The ESR material may exhibit some elasticity, although its elasticity may be less than many other polymers (e.g., particularly petrochemical-based polymers). Films, sheets and other articles may be formed from blends of ESR and any desired petrochemical-based polymer(s), providing elasticity results that may be expected to be a weighted average of the blended components. Table 3 below shows elongation at break and elastic modulus values for various standard plastic ("SP") materials, various "green" renewable plastic materials, and ESR, for comparison. The ESR in Table 3 had a tensile strength of 40 MPa.

TABLE 3

| Material | Compostable, Biodegradable Or Standard Plastic | Elongation At Break | Elastic Modulus |
|---|---|---|---|
| EcoFlex C1200 | BP | 700% | 0.10 GPa |
| ESR | BP | 100% | 1.5 GPa |
| HDPE | SP | 650% | 0.80 GPa |
| LDPE | SP | 550% | 0.40 GPa |
| PBS | BP | 450% | 0.50 GPa |
| PCL | BP | 600% | 0.20 GPa |
| PHA | BP | 300% | 3.40 GPa |
| PLA | CP | 150% | 3.50 GPa |
| PET | SP | 200% | 2.50 GPa |
| PP | SP | 500 | 1.75 GPa |
| ABS | SP | 25 | 2.00 GPa |
| Nylon | SP | 100 | 3.00 GPa |

PLA (polylactic acid) is compostable, meaning that it can degrade under elevated temperature conditions (i.e., composting conditions), but may not be "biodegradable," i.e., degrade into. The other exemplary materials listed above noted as "BP" are both biodegradable and compostable. FTC Green guidelines stipulate that a plastic cannot make an unqualified claim that it is "degradable" unless it will degrade within a "reasonably short period of time" (most recently defined as within 5 years) "after customary disposal".

The ESR materials described as suitable for use herein as the starch-based polymeric material are substantially amorphous. For example, raw starch powder (e.g., such as is used in making ESR and various other thermoplastic starch materials) has approximately a 50% crystalline structure. ESR materials available from BiologiQ differ from many other commercially available thermoplastic starch (TPS) materials in crystallinity versus amorphous characteristics. For example, p. 62-63 of "Thermoplastic Starch Composites and Blends" a PhD thesis by Kris Frost (September 2010) states "[o]f particular interest in TPS is completeness of gelatinisation during processing, and any subsequent tendency toward retrogradation to form V-type amylose crystals". Frost further continues "[g]elatinisation involves loss of granular and crystalline structures by heating with water and often including other plasticizers or modifying polymers. Retrogradation is due to the re-coiling of amylose helical coils. Starch molecules disrupted during gelatinisation slowly re-coil into their native helical arrangements or new single helical conformations known as V type, causing TPS films to rapidly become brittle and lose optical clarity". Thus, conventional TPS tends to re-form a crystalline structure after the gelatinization process used to produce the TPS from raw starch. On the contrary, the ESR material available from BiologiQ does not re-form a crystalline structure and does not become brittle.

In contrast to typical TPS materials, the ESR materials that are suitable examples of starch-based polymeric materials for use in forming articles described in the present application have an amorphous microstructure, and physical characteristics as shown in Table 2. The difference in the molecular structure between conventional TPS and ESR materials is evidenced by the ESR materials as described herein being much less crystalline than conventional thermoplastic starch-based materials as shown by X-ray crystallography. See also FIG. 1.

By way of example, the starch-based polymeric material used in making films according to the present disclosure may have a crystallinity of less than about 40%, less than about 35%, less than about 30%, less than about 25%, less than about 20%, less than about 15%, or less than about 10%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art. Additional description of ESR may be found in U.S. Published Application No. 2017/0362418, which is incorporated herein by reference in its entirety.

Composite of Polystyrene and Thermoplastic Amorphous Starch

The polystyrene and the thermoplastic amorphous starch described herein can be blended and further processed into a thermoplastic composite material that is biodegradable. The polystyrene and thermoplastic amorphous starch composite is also referred to as "biodegradable polystyrene composite." As discussed in further detail herein, such composite material retain the thermoplastic and mechanical properties of polystyrene may be extruded using conventional plastic equipment into sheets of various thicknesses, for example, in the range of about 0.010-0.090 inch ("about" means within 20% below and above a given value).

In various embodiments, the polystyrene portion represents at least half or the bulk of the composite. In more specific embodiments, the polystyrene portion is about 50-90% by weight of the composite, whereas the thermoplastic amorphous starch is about 10-50% by weight of the composite. In other embodiments, the polystyrene portion is about 55-85% by weight of the composite, whereas the thermoplastic amorphous starch is about 15-45% by weight of the composite. More typically, the polystyrene portion is about 60-80% by weight of the composite, whereas the thermoplastic amorphous starch is about 20-40% by weight of the composite. In particular, the thermoplastic amorphous starch is derived from one or more native starch and does not exhibit an X-ray diffraction peak within 20-25 degrees (2θ); or the thermoplastic amorphous starch is derived from one or more native starch and does not exhibit an X-ray diffraction peak within 22-24 degrees (2θ).

In more specific embodiments, the biodegradable polystyrene composite comprises the thermoplastic amorphous starch that has less than 1% (w/w) of water.

In other more specific embodiments, the biodegradable polystyrene composite comprises the thermoplastic amorphous starch that has less than 10% crystalline.

In other embodiments, a master batch of the composite may be made that has a higher content of the thermoplastic amorphous starch, which can be further blended with polystyrene to achieve the desired ratio. For example, a master batch may comprise equal amount of polystyrene and thermoplastic amorphous starch (50:50).

In some embodiments, one or more compatibilizers may be added to further promote the miscibility of the polystyrene and thermoplastic amorphous starch. The term "compatibilizer" refers to a composition, compound, etc., used to enhance reextrusion of polymer(s), in thermoforming recycle operations by causing what may be two or more dissimilar polymers to provide a homogeneous, or more homogeneous, melt during reextrusion. Compatibilizers which may be used in embodiments of the present disclosure include, for example, block copolymers of styrene and polyolefins, biodegradable polyolefins, such as polybutadienes, modified with maleic anhydride, citrates of fatty acids, glycerol esters, etc.

The compatibilizer may be advantageously used in amounts from about 0.05 to about 10% by weight, more typically, from about 1 to about 7% by weight of the polymer, although other concentrations may be used so long as they are effective at keeping the two or more polymers miscible and more homogeneous.

In specific embodiments, the compatibilizer may be di-block or tri-block medium molecular weight copolymers of styrene monomer units and rubber or polyolefin monomer units. Examples include linear triblock copolymers such as styrene-ethylene/butylene-styrene (SEBS) (e.g., TAIPOL™ 7126 available from TSRC Corporation, Taiwan) and styrene-ethylene/propylene-styrene (SEPS).

Thus, various embodiments provide composites of polystyrene and thermoplastic amorphous starch in a homogeneous mixture, preferably with one or more compatibilizer. By applying heat (e.g., 360-440° F.) and shear force (extrusion or kneading), the petrochemical-based polymer and starch-based polymer are blended into a homogeneous composite, in which the miscibility of the two main components are maximized at a microscopic or even molecular level.

The degree of homogeneity may be assessed by Scanning Differential Calorimetry (DSC). Homogeneous or miscible blends exhibit fewer or different glass transition points than that of unblended or immiscible polystyrene and starch.

Other additives can be included in the mixture of materials including the starch-based polymeric material and petrochemical-based polymeric material. For example, additives that aid in the biodegradation of an article can be included in the mixture of materials, such as variety of UV and OXO degradable additives, including Restore® by Enso, EcoPure® by Bio-Tec Environmental, ECM Masterbatch Pellets IM by ECM Biofilms, or Biodegradable 201 and/or Biodegradable 302 BioSphere®. Also, other additives that improve strength characteristics of the article can be added to the mixture of materials. Additives such as Biomax® Strong from Dupont can be used. In various embodiments, one or more additives can be included in the mixture of materials in an amount of at least about 0.5% by weight, at least about 1% by weight, at least about 1.5% by weight, at least about 2% by weight, at least about 2.5% by weight, at least about 3% by weight, or at least about 4% by weight. In further embodiments, one or more additives can be present in the mixture of materials in an amount of no greater than about 10% by weight, no greater than about 9% by weight, no greater than about 8% by weight, no greater than about 7% by weight, no greater than about 6% by weight, or no greater than about 5% by weight. In an illustrative example, one or more additives can be present in the mixture of materials in an amount from about 0.2% by weight to about 12% by weight. In another illustrative example, one or more additives can be present in the mixture of materials in an amount from about 1% by weight to about 10% by weight. In an additional example, one or more additives can be present in the mixture of materials in an amount from about 0.5% by weight to about 4% by weight. In a further illustrative example, one or more additives can be present in the mixture of materials in an amount from about 2% by weight to about 6% by weight.

Biodegradability

The thermoplastic composite of the polystyrene and thermoplastic amorphous starch is biodegradable or compostable. As used herein, "biodegradable" refers to any organic material (including polymer, or polymer blends or composite) which may be broken down by living organisms (e.g., microbes and/or natural environmental factors) under aerobic or anaerobic conditions into $CO_2$, water, methane, inorganic compound or biomass. In certain embodiments, the composites of the present disclosure meet the requirement of the U.S. ASTM standard for compostable plastics (ASTM D6400-99) which is consistent with the German DIN as well the upcoming European (CEN) standard. Biodegradation can also be determined using ASTM standards ASTM D5338, ASTM 5988, ASTM 5511, ASTM D7475, ASTM 5526 or ASTM D6691.

As discussed in further detail in the Examples 4 and 5, the polystyrene and thermoplastic amorphous starch composite is capable of biodegrading under both aerobic and anaerobic conditions.

"Biodegradable" has differences from "compostable." Compostable materials may satisfy one or more of the following criteria: (1) disintegration (i.e., the ability to fragment into non-distinguishable pieces after screening and safely support bio-assimilation and microbial growth; (2) inherent biodegradation by conversion of carbon to carbon dioxide to the level of at least about 60% over a period of 180 days as measured by the ASTM D6400-04 test method; (3) safety (i.e., no evidence of any eco-toxicity in finished compost and soils can support plant growth); and (4) non-toxicity (i.e., heavy metal concentrations are less than about 50% of regulated values in soils). Typically, composting is a managed or controlled decomposition process, in which the biodegradable materials are transformed into a humus-like substance called compost: the aerobic mesophilic and thermophilic degradation of organic matter into degradation products such as carbon dioxide, water, minerals, and stabilized organic matter (compost or humus). The compostability of biodegradable composites described herein may be measured by ASTM D6400-04 test method.

In certain embodiments, additional biodegradable resins may be incorporated in the thermoplastic composites to assist with degradation. Examples of additive resins include, without limitation, poly(butylene succinate), polyhydroxyalkanoates and polybutyrate adipate terephthalate. In various specific embodiments, the one or more additive biodegradable resins may be in an amount of no more than 10%, or more typically no more than 5%. In some embodiments, the additive biodegradable resins may be present at about 1-5% (w/w), or more typically, 2-4% (w/w) of the composite.

Polybutylene succinate (PBS) is biodegradable and may be conventionally made from petroleum-based feedstock or fully made from bio-based succinic acid (bioPBS).

Polyhydroxyalkanoates (PHAs) are linear polyesters produced in nature by bacterial fermentation of sugar or lipids. They are produced by the bacteria and store carbon and energy. More than 150 different monomers can be combined within this family to give materials with extremely different properties. These plastics are biodegradable and are used in the production of bioplastics.

Polybutyrate adipate terephthalate (PBAT) is a biodegradable random copolymer, specifically a copolyester of adipic acid, 1,4-butanediol and dimethyl terephthalate. PBAT is produced by many different manufacturers and may be known by the brand names Ecoflex® (from BASF).

These truly biodegradable plastics (such as bioPBS, PHA and PBAT) decompose into natural elements or compounds such as carbon dioxide, methane, water, inorganic compounds, or biomass via microbial assimilation (e.g., the enzymatic action of microorganisms on the plastic molecules).

Polystyrenes, on the other hand, cannot be readily broken down. However, in the presence of the thermoplastic amorphous starch (which is highly susceptible to biodegradation due to its starch-origin), the polystyrene component may become biodegradable or compostable. As discussed herein, the thermoplastic amorphous starch exhibits much reduced crystallinity (substantially amorphous) compared to native starch. Polystyrene is also amorphous and the process of blending (by applying heat and shear force) produces a homogenous composite. Without being bound by theory, it is believed that such amorphous microstructure of the starch-based polymeric material used may cause at least some of the petrochemical-based component (polystyrene) of the composite to degrade along with the starch-based component. In other words, microbes digesting starch-based polymer will digest the polystyrene chains that are intertwined with the starch chains.

In some embodiments, the biodegradable composite may undergo Biomethane Potential Testing (BMP) to determine the potential for anaerobic biodegradation based on methanogenesis as a percent of total methanogenesis potential. In some cases, the biomethane potential testing can be used to predict biodegradability of the tested samples according to the ASTM 5511 standard and the biomethane potential testing can be conducted using one or more conditions from the ASTM 5511 standard. For example, the biomethane potential testing can take place at a temperature of about 52° C. Additionally, the biomethane potential testing can have some conditions that are different from those of ASTM 5511. For instance, the biomethane potential testing can utilize an inoculum having from about 50% by weight water to about 60% by weight water and from about 40% by weight organic solids to about 50% by weight organic solids. In a particular illustrative example, the inoculum used in biomethane potential testing can have about 55% by weight water and about 45% by weight organic solids. Biomethane potential testing can also take place at other temperatures, such as from about 35° C. to about 55° C. or from about 40° C. to about 50° C.

Extruded Sheets and Mechanical Properties

As discussed herein, the polystyrene and thermoplastic amorphous starch can be blended at the prescribed rations (e.g., 55-85% polystyrene such as HIPS to 15-45% of starch, such as ESR or NuPlastiQ), and processed (by applying heat and shear force) to form a composite. One or more compatibilizers may be added, for example, at an amount of up to 10% of the total weight of the blend. Other plasticizers may also be added to further modify the physical and mechanical properties of the composite.

The composite may be used in any application or any article of manufacture in which conventional polystyrene is used.

In one embodiment, the resulting composite can be extruded in sheets of various thicknesses, for example, in the range of 0.01-0.09 inch. The thickness of the sheeting can be controlled by the line speed and trim of the extruder. See Example 1.

At thickness within the range of 0.02-0.09 inch, the sheet extruded from the thermoplastic composite has comparable flexural strength (e.g., modulus of rupture, or bend strength) as the unblended HIPS of the same thickness. See Example 3.

Like HIPS-based sheet, the extruded sheets of biodegradable polystyrene composite are good substrates for direct printing (e.g., inkjet printing) or transfer printing (thermal or cold foil).

In some embodiments, these sheets are suitable for making plastic bag closures that can quickly and securely grip and hold close the necks of flexible bags. Conventional bag closures are generally small, thin, flat pieces of plastic made of polystyrenes (e.g., HIPS). The polystyrene composite of the present disclosure are biodegradable alternatives to the conventional bag closures. Because the composite had comparable mechanical properties as unblended HIPS, all the conventional equipment for making the bag closure and for the assembly line for closing the bags can be used for the composite-based bag closure.

Figure 2:
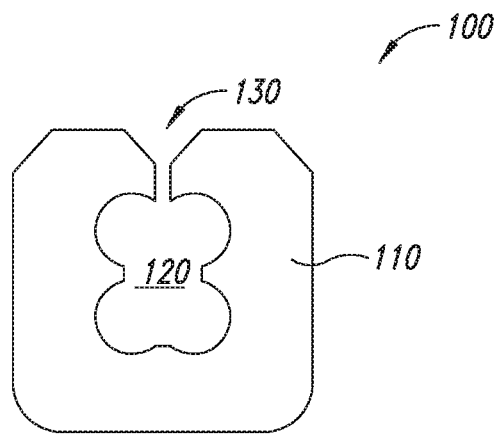
FIG. 2 shows a convention bag closure made of polystyrene resin.

FIG. 2 shows a conventional bag closure (100) that includes a plastic body (110) (e.g., HIPS), a bag-holding central aperture (120), which is connected to a narrow access opening (130). The access opening (130) receives the neck of a flexible bag (not shown), which is then held within the central aperture (120). The bag closures may be conventionally prepared by any of the methods disclosed U.S. Pat. Nos. 3,164,249, 3,164,250, 4,333,566 4,999,969 and 4,911,293. Typically, the bag closures of the present disclosure may be prepared by extruding the biodegradable composite resin to form a flat resinous web of about 0.02-0.09 inch thick; forming one or more multi-closure strips from the flat resinous web, and separating individual bag closures from the multi-closure strip.

The thickness of the extruded sheets may vary depending on the specific types of the bag closure. Suitable thickness include 0.02-0.09 inch thick, or 0.02-0.08 inch thick, or 0.02-0.06 inch thick, or 0.03-0.05 inch thick, or 0.02 inch thick, or 0.03 inch thick, or 0.04 inch thick, or 0.05 inch thick, or 0.06 inch thick, or 0.07 inch thick, or 0.08 inch thick or 0.09 inch thick.

Figure 3:
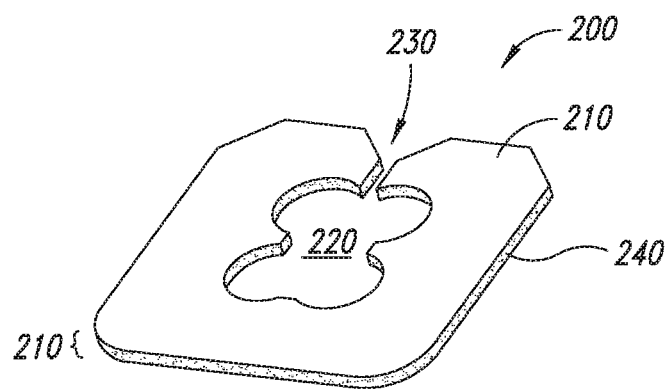
FIG. 3 shows an embodiment according to the present disclosure of a biodegradable bag closure.

By replacing the conventional polystyrene resins (e.g., HIPS) with the biodegradable composite according to the present disclosure, biodegradable bag closures may be made. FIG. 3 shows an embodiment of a bag closure formed of a biodegradable composite resin. As shown, a bag closure (200) has a resinous body (210) having a bag-holding central aperture (220) and an access opening (230), wherein the access opening joins the bag-holding central aperture to define a continuous space, and wherein the resinous body (210) is a biodegradable composite (240) of polystyrene (e.g., HIPS) and thermoplastic amorphous starch (e.g., ESR GS-270).

Figure 4:
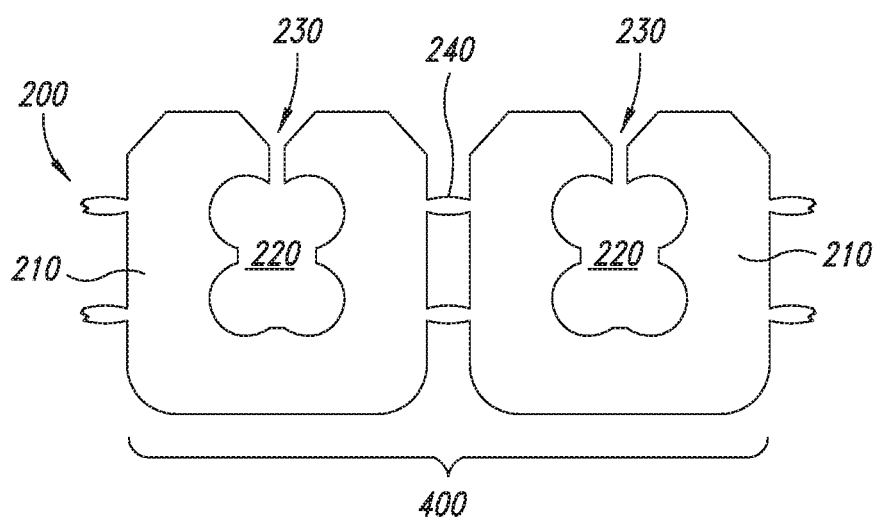
FIG. 4 shows a multi-closure strip according to one embodiment of the disclosure.

A further embodiment thus provides a multi-closure strip. FIG. 4 shows a multi-closure strip (400) of a plurality of bag closures (200) (only two are shown). The bag closures (200)

are the same as shown in FIG. 3, except that the two adjacent bag closures (200) are connected by one or more tabs (240). These tabs can be broken off to cause separation of the bag closures (200) from one another. The tabs may be in any configurations so long as they can sustain the machining process and be broken off when a specific force is applied. See e.g., U.S. Pat. No. 4,333,566.

For thinner sheeting of less than 0.03 inch, the sheeting is more flexible and finds different applications from the thicker sheeting. For instance, thin sheeting of about 0.01 in may be used in as nursery tags (hang or push-on) or labels, plant stakes, wrap-around and utility tags (trees). It is particularly advantageous that these tags are durable yet ultimately biodegradable, thus obviating the need for removing them from the plants.

A specific embodiment provides a biodegradable label comprising a flat resinous body having a printable surface, wherein the flat resinous body comprises a biodegradable polystyrene composite of any one of the embodiments described herein, wherein the flat resinous body is no more than 0.03 inch thick. In other embodiments, the flat resinous body is about 0.01-0.028 inch thick. Optionally, the biodegradable label may comprise an adhesive on a surface opposite the printing surface.

In other embodiments, stripes made from the flexible thin sheeting may be used as bag closures that can be tied up or wrapped around; or used directly on produce bunches as ties or closures.

Thinner sheeting may require that the biodegradable composite to contain more plasticizer to counter the brittleness imparted by the starch.

EXAMPLES

Example 1

A composite (Test Sample 2020) of 20% ESR, 71% PS 825E, 2% bioPBS, 7% SEBS 7126 was prepared and extruded at 030 mil (0.03 inch) thickness with no colorant or down blending. The heat profile during the extrusion was as follows:

| | |
|---|---|
| Extruder Zone 1 | 360° F. |
| Extruder Zone 2 | 380° F. |
| Extruder Zone 3 | 404° F. |
| Extruder Zone 4 | 409° F. |
| Extruder Zone 5 | 419° F. |
| Extruder Zone 6 | 421° F. |
| Screen | 400° F. |
| Inlet | 400° F. |
| Pump | 400° F. |
| Mixer | 400° F. |
| Adapter | 400° F. |
| Die 1 | 437° F. |
| Die 2 | 437° F. |
| Die 3 | 437° F. |

The line speed and trim are controlled to maintain a given thickness during extrusion. For example, for 030 mil sheet, the line speed can be 46.0 feet per minute (fpm), and the trim is 46.7 fpm. For 057 mil sheet, the line speed and trim are 23.7 fpm and 24.3 fpm, respectively. For 072 mil sheet, the line speed and trim are 19.5 fpm and 21.1 fpm.

The extruded sheet was aged or cured for 24-72 hours.

Example 2

The 030 mil sheet was subjected to ASTM D-638 testing to assess the tensile strength in the machine and transverse directions. As a control, unblended HIPS (100% PS 825E) was also prepared and tested. Table 4 shows the data for machine direction. Table 5 shows the data for transverse direction. As shown, the extruded sheet from the biodegradable composite exhibited poorer tensile strength as the control.

TABLE 4

| | | | Machine Direction | | | | | |
|---|---|---|---|---|---|---|---|---|
| SO#/ R&D | Force @ Peak (kgf) | Elong. @ Peak (mm) | Stress @ Peak (kgf/mm$^2$) | Strain @ Peak (%) | Strain @ Break (%) | Width (mm) | Thickness (mm) | Force @ Peak (lbf) |
| Control (HIPS) | 11.72 | 29.77 | 2.57 | 32.93 | 32.94 | 6.00 | 0.76 | 25.83 |
| Test sample 2020 | 9.74 | 2.29 | 2.00 | 2.53 | 24.50 | 6.24 | 0.78 | 21.48 |

TABLE 5

| | | | Transverse Direction | | | | | |
|---|---|---|---|---|---|---|---|---|
| SO#/ R&D | Force @ Peak (kgf) | Elong. @ Peak (mm) | Stress @ Peak (kgf/mm$^2$) | Strain @ Peak (%) | Strain @ Break (%) | Width (mm) | Thickness (mm) | Force @ Peak (lbf) |
| Control (HIPS) | 10.27 | 20.92 | 2.25 | 23.13 | 27.34 | 6.00 | 0.76 | 22.65 |
| Test sample 2020 | 8.45 | 2.10 | 1.74 | 2.33 | 6.68 | 6.24 | 0.78 | 18.63 |

Example 3

The 030 mil sheet was subjected to ASTM D-790 testing to assess the flexural strength in the machine and transverse directions. As a control, unblended HIPS (100% PS 825E) was also prepared and tested. Table 6 shows the data for machine direction. Table 7 shows the data for transverse direction. As shown, the extruded sheet from the biodegradable composite exhibited comparable flexural strength as the control.

TABLE 6

Machine Direction

| SO#/R&D | Control (HIPS) | Test sample 2020 |
|---|---|---|
| Force @ Peak (N) | 7.25 | 6.70 |
| Strain @ Peak (%) | 0.83 | 0.68 |
| Strain @ Break (%) | 2.73 | 2.67 |
| Bending Strength @ Peak (N/mm$^2$) | 68.35 | 66.44 |
| Bending Modulus (N/mm$^2$) | 16011.56 | 14964.27 |
| Bending Strength @ Yield (N/mm$^2$) | 68.27 | 66.39 |
| Width (mm) | 12.70 | 12.70 |
| Thickness (mm) | 0.80 | 0.78 |
| Force @ Break (lbf) | 0.74 | 0.62 |
| Force @ 0.250 mm (N) | 0.62 | 0.60 |
| Def. @ Yield (mm) | 4.35 | 3.73 |

TABLE 7

Transverse Direction

| SO#/R&D | Control (HIPS) | Test sample 2020 |
|---|---|---|
| Force @ Peak (N) | 7.05 | 6.00 |
| Strain @ Peak (%) | 0.81 | 0.69 |
| Strain @ Break (%) | 2.73 | 2.66 |
| Bending Strength @ Peak (N/mm$^2$) | 66.46 | 59.51 |
| Bending Modulus (N/mm$^2$) | 15455.42 | 14478.79 |
| Bending Strength @ Yield (N/mm$^2$) | 66.39 | 59.47 |
| Width (mm) | 12.70 | 12.70 |
| Thickness (mm) | 0.80 | 0.78 |
| Force @ Break (lbf) | 0.75 | 0.61 |
| Force @ 0.250 mm (N) | 0.63 | 0.59 |
| Def. @ Yield (mm) | 4.32 | 3.79 |

Example 4

Aerobic Biodegradation

Polystyrene and thermoplastic amorphous starch composite according to an embodiment of the present disclosure was tested for its biodegradability. The testing was conducted by Eden Research Lab (Albuquerque, N. Mex.) according to ASTM D5538-11, which is a standard test method for determining aerobic biodegradation of plastic materials under high-solids aerobic-digestion conditions considering gas evolution. More specifically, the test monitors the level of microbial activity of aerobic organisms (inoculum) as they are exposed to test material. If the inoculum recognizes the test material as a nutrient source, then an increase in activity is recorded in the form of gas evolution. The evolved gas, such as $CO_2$ and $CH_4$, is monitored for volume (e.g., measured by water displacement) and composition (e.g., by gas chromatograph).

Test samples were setup in triplicate and were run against three or four triplicate controls. In this Example, the positive control was cellulose, which has well-established biodegradable profile (percentage biodegradation as a function of time). The negative control was 100% HIPS. The test samples were composite of 71% HIPS, 20% ESR (inclusive of styrene-ethylene/butylene-styrene (SEBS) compatibilizer and BioPBS) and 1% pigment. The test samples and the negative control were both 30 mil (0.03 inch) thick and similar-sized strips 0.5 inch long.

The inoculum was a proprietary blend developed by the testing facility. The inoculum comprises soil from landfills. The inoculum provides the background control.

The test ran for 177 days. Table 8 shows the cumulative degradants' volume and compositions for the background control, positive control, negative control and test sample. As shown in Table 8, the negative control (as expected) failed to degrade to any extent. The positive control, also as expected, degraded completely within the testing period. Unexpectedly, the test sample, despite the high content of HIPS, almost all degraded after adjusted for background control.

TABLE 8

| | Inoculum | Negative | Positive | Test Sample |
|---|---|---|---|---|
| Cumulative Gas Volume (mL) | 2579.0 | 1895.7 | 100661.3 | 31300.5 |
| Percent $CO_2$ (%) | 75.6 | 69. | 84.2 | 86.6 |
| Volume $CO_2$ (mL) | 1948.6 | 1310.9 | 8475.5 | 27119.5 |
| Mass $CO_2$ (g) | 3.83 | 2.58 | 16.65 | 53.27 |
| Sample Mass (g) | 1,000 | 10 | 10 | 20.0 |
| Theoretical Sample Mass (g) | 0.0 | 8.6 | 4.2 | 16.3 |
| Biodegraded Mass (g) | 1.04 | 0.70 | 4.54 | 14.53 |
| Percent Biodegraded (%) | | −4.0 | 82.9 | 82.5 |
| Adjusted Percent Biodegraded (%) | | −4.8 | 100.0 | 99.6 |

Figure 5:
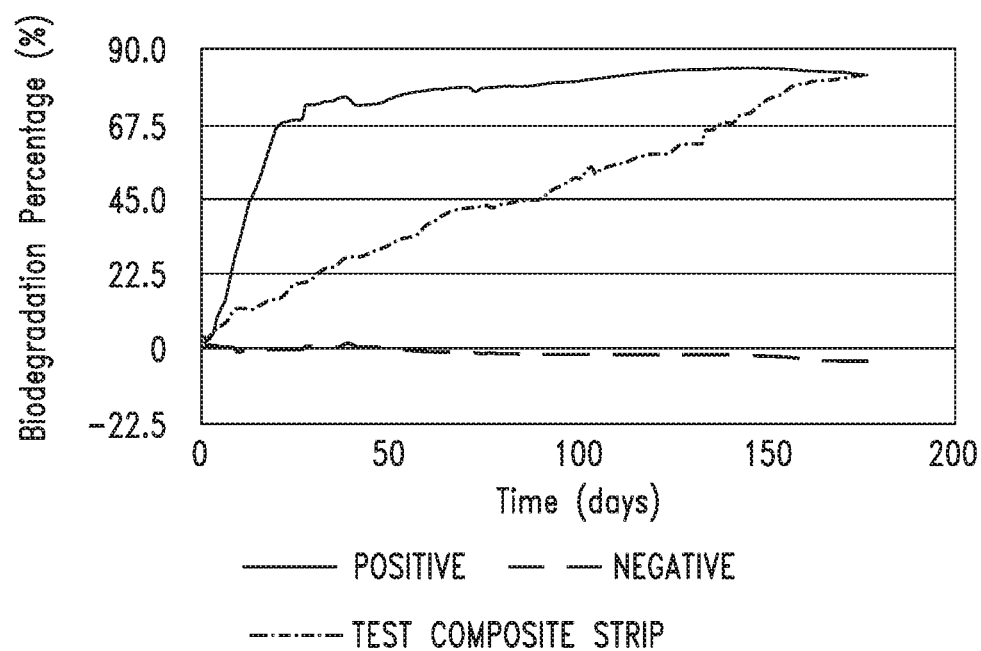
FIG. 5 shows the biodegradation progression over time under aerobic condition (ASTM D5338 testing protocol) of a composite of polystyrene resin and thermoplastic amorphous starch according to an embodiment of the present disclosure.

FIG. 5 shows the percentage biodegradation of the positive control, negative control and the test sample as a function of time. As shown, the positive control largely degraded within 20 days and completely degraded by the end of the testing period. The negative control failed to degrade to any extent at any point of time. The test sample, on the other hand, degraded continuously and steadily and ultimately reaching the same percentage degradation as the positive control. This example shows that the composites described in the present disclosure are capable of fully biodegrading under aerobic condition within 6 months.

Example 5

Anaerobic Biodegradation

Biodegradation in anaerobic conditions was conducted according to ASTM D5511, which is a standard test method for determining anaerobic biodegradation of plastic materials under high-solids anaerobic-digestion conditions considering gas evolution. The tests were conducted in a similar manner as Example 5, except under anaerobic conditions. Typically, inoculum (as in soil) contains both aerobic and anaerobic microbes. The microbial activities are different and one can dominate the other depending on the oxygen levels. Biodegradation under anaerobic condition generally takes substantially longer than biodegradation under aerobic condition. The ASTM D5511 protocol thus typically simulates biodegradation in landfills.

The test initially ran for 177 days. Table 9 shows the cumulative degradants' volume and compositions for the background control, positive control, negative control and test sample. As shown in Table 9, the negative control failed to degrade to any extent. The positive control degraded completely within the testing period. The test sample, despite the high content of HIPS, also degraded, though to a lesser extent within the same time period compared to the degradation under aerobic condition (see Example 4).

TABLE 9

|  | Inoculum | Negative | Positive | Test Sample |
|---|---|---|---|---|
| Cumulative Gas Volume (mL) | 2913.7 | 3348.6 | 11065.4 | 11019.2 |
| Percent CH$_4$ (%) | 33.6 | 38.0 | 41.5 | 44.8 |
| Volume CH$_4$ (mL) | 980.0 | 1273.6 | 4592.1 | 4934.5 |
| Mass CH$_4$ (g) | 0.70 | 0.91 | 3.28 | 3.52 |
| Percent CO$_2$ (%) | 44.2 | 39.3 | 41.4 | 38.2 |
| Volume CO$_2$ (mL) | 1288.2 | 1315.6 | 4577.4 | 4207.8 |
| Mass CO$_2$ (g) | 2.53 | 2.58 | 8.99 | 8.27 |
| Sample Mass (g) | 10 | 10 | 10 | 20.0 |
| Theoretical Sample Mass (g) | 0.0 | 8.6 | 4.2 | 16.3 |
| Biodegraded Mass (g) | 1.22 | 1.39 | 4.91 | 4.90 |
| Percent Biodegraded (%) |  | 2.0 | 87.6 | 22.5 |
| *Adjusted Percent Biodegraded (%) |  | 2.3 | 100.0 | 25.7 |

Figure 6:
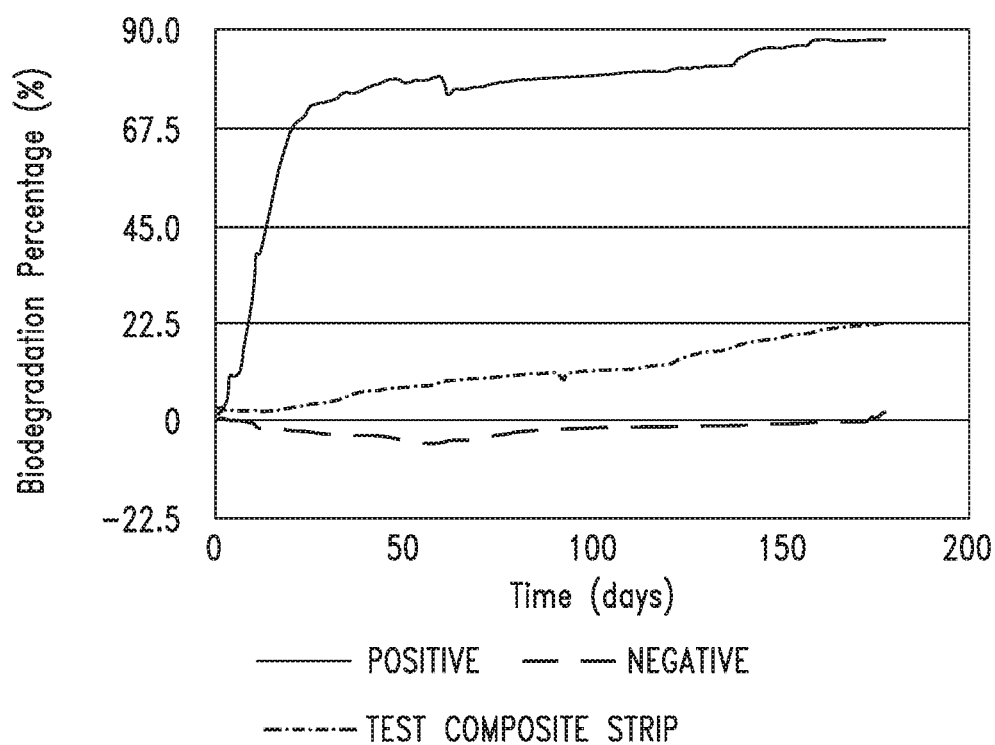
FIG. 6 shows the biodegradation progression over time under anaerobic condition (ASTM D5511 testing protocol) of a composite of polystyrene resin and thermoplastic amorphous starch according to an embodiment of the present disclosure.

FIG. 6 shows the percentage biodegradation of the positive control, negative control and the test sample as a function of time over the initial period of 177 days. As shown, the positive control largely degraded within 20 days and completely 15 degraded by the end of the testing period (similar to the degradation under aerobic condition). The negative control failed to degrade to any extent at any point of time. The test sample, though degraded to a lesser extent compared to the aerobic condition, shows a continuous and steady degradation curve, suggesting a trend of further degradation had the testing period been longer. This example shows that the composites described in the present disclosure are capable of steady biodegradation under anaerobic condition. Though the biodegradation is slower under anaerobic condition when compared to the biodegradation under aerobic condition, the degradation trend indicates that further biodegradation can be achieved over a longer testing period.

Table 10 shows the test results of after an additional 168 days of biodegradation, making the total test period 345 days. As shown, the test sample substantially further degraded (46% adjusted) compared to 25.7% at the end of the initial test period of 177 days.

TABLE 10

|  | Inoculum | Negative | Positive | Test Sample |
|---|---|---|---|---|
| Cumulative Gas Volume (mL) | 3448.9 | 3179.0 | 11736.4 | 16638.3 |
| Percent CH$_4$ (%) | 36.5 | 36.5 | 42.5 | 48.3 |
| Volume CH$_4$ (mL) | 1257.3 | 1158.8 | 4984.5 | 8031.8 |
| Mass CH$_4$ (g) | 0.9 | 0.83 | 3.56 | 5.74 |
| Percent CO$_2$ (%) | 42.7 | 39.7 | 41.0 | 36.6 |
| Volume CO$_2$ (mL) | 1471.3 | 1262.6 | 4814.8 | 6092.6 |
| Mass CO$_2$ (g) | 2.89 | 2.48 | 9.46 | 11.97 |
| Sample Mass (g) | 10 | 10 | 10 | 20.0 |
| Theoretical Sample Mass | 0.0 | 8.6 | 4.2 | 16.3 |
| Biodegraded Mass (g) | 1.46 | 1.30 | 5.25 | 7.57 |
| Percent Biodegraded (%) |  | −1.9 | 89.8 | 37.4 |
| *Adjusted Percent Biodegraded (%) |  | −2.1 | 100.0 | 41.6 |

Figure 7:
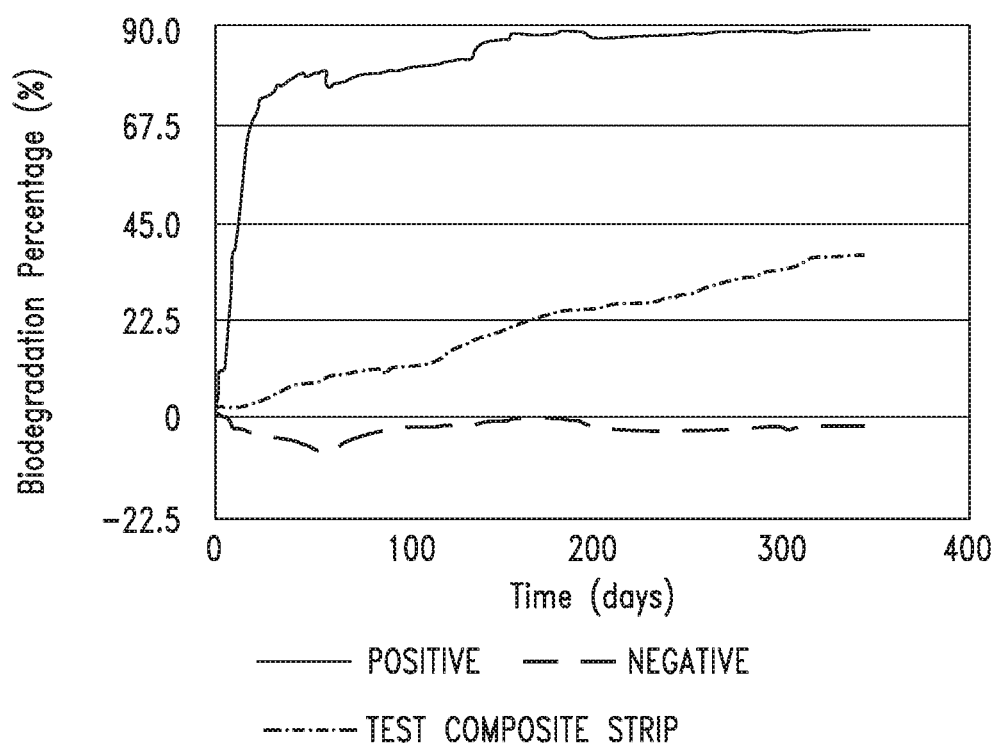
FIG. 7 shows the biodegradation progression over a longer period of time under anaerobic condition (ASTM D5511 testing protocol).

FIG. 7 shows the percentage biodegradation of the positive control, negative control and the test sample as a function of time over a test period of 345 days. As shown, the test sample continuously and steadily degraded over the entire period. The degradation trend is consistent with that of FIG. 6, which further indicates that complete biodegradation can be achieved over an extended period of time.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

This application claims the benefit under 35 U.S.C. § 119(e) to U.S. Provisional Application No. 62/483,109 filed Apr. 7, 2017, which application is hereby incorporated by reference in its entirety.

The invention claimed is:

1. A bag closure comprising:
 a flat resinous body having an access opening and a bag-holding central aperture, wherein the access opening joins the bag-holding central aperture to define a continuous space, wherein the flat resinous body is 0.02-0.09 inch thick, and wherein the flat resinous body comprises an extruded sheet of a biodegradable polystyrene composite including:
 55-85% (w/w) polystyrene; and
 15-45% (w/w) thermoplastic amorphous starch, wherein the thermoplastic amorphous starch is derived from one or more native starches without esterification and does not exhibit an X-ray diffraction peak within 20-25 degrees (2θ).

2. The bag closure of claim 1 wherein the thermoplastic amorphous starch has less than 1% (w/w) of water by weight of the thermoplastic amorphous starch.

3. The bag closure of claim 1 wherein the thermoplastic amorphous starch has less than 10% crystallinity.

4. The bag closure of claim 1 wherein the thermoplastic amorphous starch is derived from one or more native starches and a plasticizer, whereby the plasticizer forms hydrogen bonds with the one or more native starches.

5. The bag closure of claim 4 wherein the plasticizer is glycerin, sorbitol, glycols, maltodextrin, ethylene glycol, propylene glycol, urea or a combination thereof.

6. The bag closure of claim 1 wherein the biodegradable polystyrene composite further comprises a compatibilizer.

7. The bag closure of claim 6 wherein the compatibilizer is styrene-ethylene/butylene-styrene.

8. The bag closure of claim 1 wherein the biodegradable polystyrene composite further comprises a biodegradable resin additive.

9. The bag closure of claim 8 wherein the biodegradable resin additive is polybutylene succinate, polyhydroxyalkanoate, polybutyrate adipate terephthalate, or a mixture thereof.

10. The bag closure of claim 1 wherein the polystyrene is polystyrene-polybutadiene copolymer.

11. The bag closure of claim 1 wherein the polystyrene is in an amount of 70-80% w/w of the biodegradable polystyrene composite.

12. A label comprising:
a flat resinous body having a printable surface, wherein the flat resinous body comprises an extruded sheet of a biodegradable polystyrene composite, wherein the flat resinous body is 0.01-0.03 inch thick, wherein the biodegradable polystyrene composite includes:
55-85% (w/w) polystyrene; and
15-45% (w/w) thermoplastic amorphous starch; wherein the thermoplastic amorphous starch is derived from one or more native starches without esterification and does not exhibit an X-ray diffraction peak within 20-25 degrees (2θ).

13. The label of claim 12 wherein the thermoplastic amorphous starch has less than 1% (w/w) of water by weight of the thermoplastic amorphous starch.

14. The label of claim 12 wherein the thermoplastic amorphous starch has less than 10% crystallinity.

15. The label of claim 12 wherein the thermoplastic amorphous starch is derived from one or more native starches and further comprises a plasticizer that forms hydrogen bonds with the one or more native starches.

16. The label of claim 15 wherein the plasticizer is glycerin, sorbitol, glycols, maltodextrin, ethylene glycol, propylene glycol, urea or a combination thereof.

17. The label of claim 12 wherein the biodegradable polystyrene composite further comprises a compatibilizer.

18. The label of claim 17 wherein the compatibilizer is styrene-ethylene/butylene-styrene.

19. The label of claim 12 wherein the biodegradable polystyrene composite further comprises one or more biodegradable resin additives selected from the group consisting of polybutylene succinate, polyhydroxyalkanoate and, polybutyrate adipate terephthalate.

20. The label of claim 12 wherein the polystyrene is polystyrene-polybutadiene copolymer.

* * * * *